United States Patent
Redmond et al.

(10) Patent No.: US 11,828,139 B2
(45) Date of Patent: Nov. 28, 2023

(54) PUMPJACK HAVING LINEAR ALTERNATOR

(71) Applicant: Schneider Electric Systems USA, Inc., Foxborough, MA (US)

(72) Inventors: James Redmond, Richmond (CA); Zackery Sobin, Raleigh, NC (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 0 days.

(21) Appl. No.: 17/127,072

(22) Filed: Dec. 18, 2020

(65) Prior Publication Data

US 2022/0195847 A1   Jun. 23, 2022

(51) Int. Cl.
| | |
|---|---|
| *E21B 41/00* | (2006.01) |
| *E21B 43/12* | (2006.01) |
| *H02K 11/21* | (2016.01) |
| *H02K 11/215* | (2016.01) |
| *F04B 47/02* | (2006.01) |
| *H02K 7/18* | (2006.01) |

(52) U.S. Cl.
CPC ........ *E21B 41/0085* (2013.01); *E21B 43/127* (2013.01); *F04B 47/02* (2013.01); *H02K 7/1884* (2013.01); *H02K 11/21* (2016.01); *H02K 11/215* (2016.01)

(58) Field of Classification Search
CPC .... E21B 41/0085; E21B 43/127; F04B 47/02; H02K 7/1884; H02K 11/21; H02K 11/215
See application file for complete search history.

(56) References Cited

U.S. PATENT DOCUMENTS

| | | | |
|---|---|---|---|
| 4,805,407 A | | 2/1989 | Buchanan |
| 5,347,186 A | * | 9/1994 | Konotchick .......... H02K 35/04 322/3 |
| 5,409,356 A | * | 4/1995 | Massie .................. H02K 41/02 74/110 |
| 10,340,755 B1 | * | 7/2019 | Dreher ............... E21B 41/0085 |
| 2007/0075545 A1 | * | 4/2007 | Wilson, Sr. ........... H02K 53/00 290/1 R |

(Continued)

OTHER PUBLICATIONS

EP Extended Search Report for EP Application No. 21212006.7 dated May 16, 2022.

*Primary Examiner* — Tara Schimpf
*Assistant Examiner* — Yanick A Akaragwe
(74) *Attorney, Agent, or Firm* — Locke Lord LLP (57) ABSTRACT

Systems and methods for providing power to devices at a well site employ a linear alternator to generate power at a well site. The linear alternator is mounted on a pump at the well site and uses the up-and-down motion of the pump to generate power. The pump may be a nodding donkey head pump or other sucker rod pump mechanisms that operate based on linear vertical motion. The linear vertical motion drives a linear rotor back and forth through a linear stator to induce current in the linear alternator. This allows the linear alternator to convert a portion of the mechanical work performed by the pump into electrical energy that can be supplied to the devices. In some embodiments, the pump-mounted linear alternator can be equipped with a position sensor to directly measure a vertical position of the pump as the alternator travels up and down with the pump.

20 Claims, 6 Drawing Sheets

(56) References Cited

U.S. PATENT DOCUMENTS

| | | | |
|---|---|---|---|
| 2009/0079199 A1 | 3/2009 | Tubel | |
| 2014/0312719 A1* | 10/2014 | Isaacs | H02K 35/02 |
| | | | 310/30 |
| 2015/0345280 A1* | 12/2015 | Krauss | E21B 43/121 |
| | | | 700/282 |
| 2017/0234310 A1* | 8/2017 | Mancuso | F04B 49/20 |
| | | | 417/1 |
| 2018/0347319 A1 | 12/2018 | Feluch et al. | |
| 2021/0172300 A1* | 6/2021 | Rodger | E21B 43/123 |
| 2021/0381349 A1* | 12/2021 | Xiao | E21B 34/08 |
| 2022/0025717 A1* | 1/2022 | Netecke | B66D 1/36 |

* cited by examiner

PUMPJACK HAVING LINEAR ALTERNATOR

TECHNICAL FIELD

The present disclosure relates to methods and system for providing power to devices and instruments used on oil and gas wells and, more particularly, to methods and systems for generating power using the motion of a pump at an oil and gas well.

BACKGROUND

Oil and gas wells operate to extract hydrocarbons from a subterranean formation. A typical well site includes a wellbore that has been drilled into the formation and sections of pipe or casing cemented in place within the wellbore to stabilize and protect the wellbore. The casing is perforated at a certain target depth in the wellbore to allow oil, gas, and other wellbore fluids to flow from the formation into the casing. Tubing is run down the casing to provide a conduit for the wellbore fluids to flow up to the surface where they are collected. The wellbore fluids can flow up the tubing naturally if there is sufficient pressure in the formation, or well pump equipment can be used to provide an artificial lift for the wellbore fluids.

To operate an artificial lift system in a cost-effective manner, the well pump needs to be monitored and attention needs to be paid to the pump speed, pump fillage, flow rate, and other parameters. This monitoring involves the use of several types of devices and instruments on and around the well, including load cells, position sensors, flow meters, pressure sensors, temperature sensors, and the like. The power needed for these devices is usually provided from a motor drive, usually the same motor drive that drives the pump. However, the motor drive is usually located away from the various devices, so power cables need to be run from the motor drive to each device, which can clutter up the well site. The power cables are also susceptible to wear and tear and damage from exposure to the well site environment. In addition, extremely long cables are often needed for devices that are located downhole, which can be costly to install and maintain. And while battery-operated devices are available, the batteries for these devices need to be regularly recharged or replaced.

Thus, while a number of advances have been made in the field of oil and gas production, it will be readily appreciated that improvements are continually needed.

SUMMARY

The present disclosure relates to systems and methods for generating power directly at a well site to provide operating power to devices and instruments at the well site. The systems and methods employ a linear alternator, or linear generator, mounted on or to a pump at the well site to produce power for the devices and instruments. The linear alternator uses the up-and-down motion of the pump to drive a linear rotor back and forth in a linear stator to generate power. The pump may be a nodding donkey head pump or other sucker rod pump mechanisms that operate based on linear vertical motion. The linear alternator converts a portion of the mechanical work performed by the pump into electrical energy that can be supplied to the devices and instruments. In some embodiments, the pump-mounted linear alternator can be equipped with a position sensor to directly measure a vertical position of the pump as the alternator travels up and down with each stroke of the pump.

In general, in one aspect, the present disclosure relates to a system for generating power at a well site. The system comprises, among other things, a pump assembly at the well site, the pump assembly operable to extract wellbore fluid from a wellbore at the well site using a pumping motion. The system further comprises a linear alternator mounted to the pump assembly, the linear alternator having a linear stator and a linear rotor positioned within the linear stator. The pumping motion used by the pump assembly causes the linear rotor to pass back and forth through the linear stator to thereby generate power.

In general, in one aspect, the present disclosure relates to a method of generating power at a well site. The method comprises, among other things, installing a pump assembly at the well site, mounting a linear alternator to the pump assembly, the linear alternator having a linear stator and a linear rotor positioned within the linear stator. The method further comprises operating the pump assembly using a pumping motion to extract wellbore fluid from a wellbore at the well site. The pumping motion used by the pump assembly causes the linear rotor to pass back and forth through the linear stator to thereby generate power.

In general, in one aspect, the present disclosure relates to a system for supplying power to devices at a well site. The system comprises, among other things, a pump assembly at the well site, the pump assembly operable to extract wellbore fluid from a wellbore at the well site using a pumping motion. The system also comprises a linear alternator mounted to the pump assembly, the linear alternator having a linear stator and a linear rotor positioned within the linear stator, wherein the pumping motion used by the pump assembly causes the linear rotor to pass back and forth through the linear stator to thereby generate power. The system further comprises one or more devices mounted on or around the pump assembly, the one or more devices operable to measure one or more operational parameters of the pump assembly, and cabling running from the linear alternator to the one or more devices, the cabling conveying the power generated by the linear alternator to the one or more devices.

In accordance with any one or more of the foregoing embodiments, the linear alternator includes a position sensor operable to measure a vertical position of the linear stator or the linear rotor, and, optionally, the position sensor is one of an altimeter or a magnetic encoder.

In accordance with any one or more of the foregoing embodiments, the linear stator moves with the pumping motion used by the pump assembly and the linear rotor remains stationary, and, optionally, the pump assembly is a rod pump assembly and the linear stator is attached to one of a bridle of the rod pump assembly or a donkey head of the rod pump assembly.

In accordance with any one or more of the foregoing embodiments, the linear rotor moves with the pumping motion used by the pump assembly and the linear stator remains stationary, and/or the linear alternator is mounted to the pump assembly at a downhole location of the pump assembly.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

The following discussion is presented to enable a person ordinarily skilled in the art to synthesize and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

Figure 1:
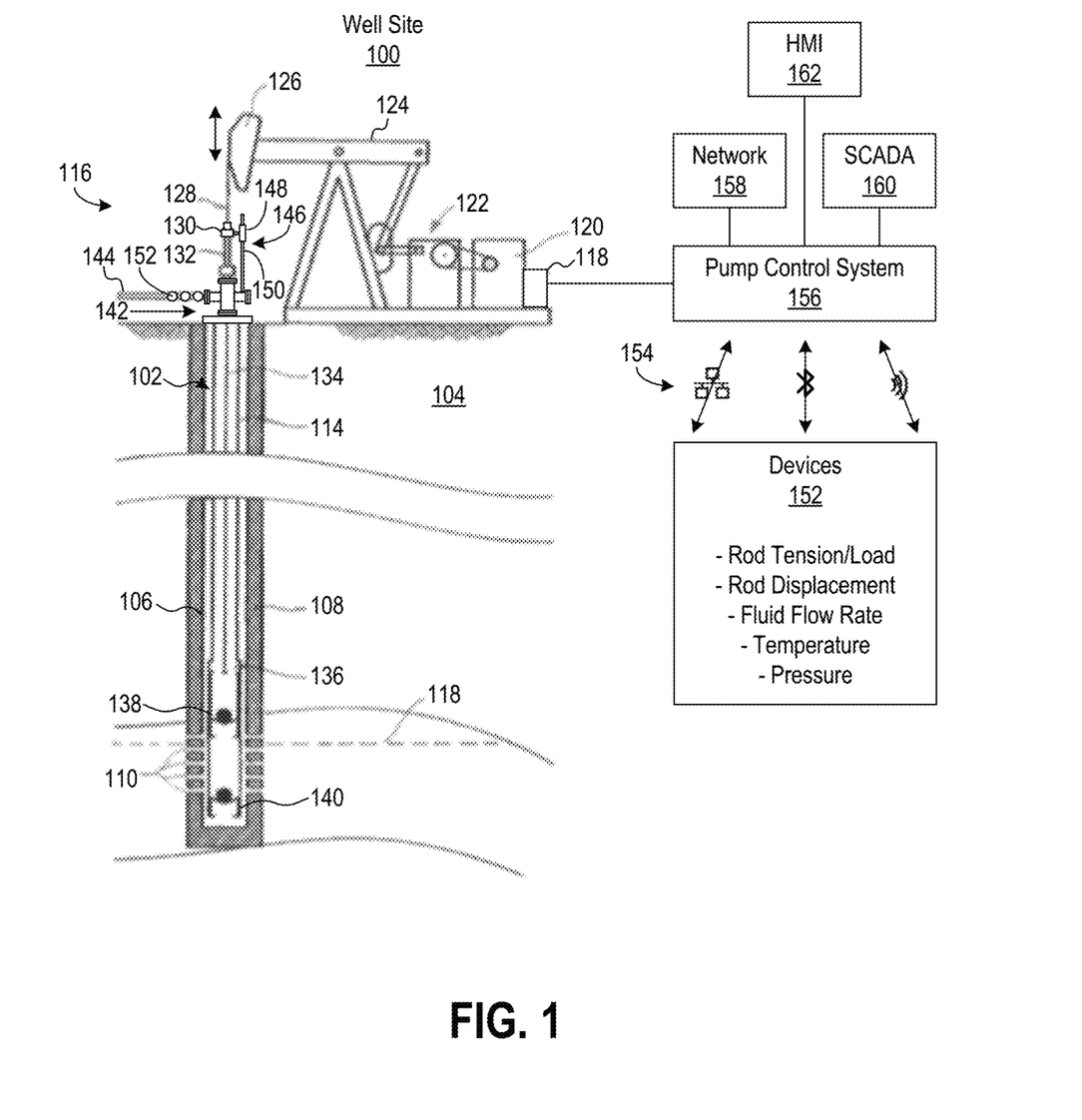
FIG. 1 is a schematic diagram illustrating a well site where a pump-mounted linear alternator is used to generate power according to embodiments of the disclosure.

Referring now to FIG. 1, a schematic diagram of an exemplary well site 100 is shown according to embodiments of the present disclosure. At this well site 100, a wellbore 102 has been drilled into a subterranean formation 104 and lined with a casing 106 and cement 108 to stabilize and protect the wellbore 102. Perforations 110 are formed in the casing 106 and cement 108 at a certain target depth 112 where oil, gas, and other wellbore fluids are expected to be found. Tubing 114 is extended into the wellbore 102 for extraction of wellbore fluids entering through the perforations 110. The formation 104 in this example no longer has sufficient formation pressure to produce wellbore fluids naturally and therefore a rod pump assembly 116 is installed at the well site 100 to provide artificial lift for the wellbore fluids. The rod pump assembly 116, also called a donkey head pump jack, includes a variable speed drive (VSD) 118, variable speed motor 120, gear box 122, beam 124, donkey head 126, bridle cables 128 and bridle 130, polished rod 132, and sucker rod 134, connected as shown.

Operation of the rod pump assembly 116 is well known to those skilled in the art and is thus mentioned only briefly here. In general, the VSD 118 drives the variable speed motor 120 to rotate gears in the gearbox 122, causing the beam 124 to seesaw, which moves the donkey head 126, and hence the bridle cables 128 and bridle 130, polished rod 132, and sucker rod 134, up and down, thereby converting the rotating motion of the variable speed motor 120 into a linear motion at the sucker rod 134. A plunger 136 is attached to the end of the sucker rod 134 for lifting the wellbore fluids.

The plunger 136 has a traveling valve 138 at a bottom thereof that opens on the downward stroke of the sucker rod 134 to let wellbore fluids into the plunger 136 and hence into the tubing 120. The traveling valve 138 closes on the upward stroke of the sucker rod 134, thereby lifting the wellbore fluids up the tubing 114. Conversely, a pump barrel 140 at the bottom of the tubing 114 has a standing valve (not specifically labeled) that closes on the downward stroke of the sucker rod 134 and opens on the upward stroke to let in wellbore fluids from the wellbore 110. At the surface, a wellhead 142, also called a Christmas tree, diverts the wellbore fluids into one or more discharge lines 144 that carry the fluids to one or more holding tanks (not expressly shown) for storage and processing.

In accordance with one or more embodiments the present disclosure, a linear alternator 146 may be provided that makes use of the up-and-down motion of the pump assembly 116 to generate power. The linear alternator 146 may be composed primarily of a linear stator 148 containing a plurality of coils and a linear rotor 150 containing a plurality of magnets. Linear alternators, as known to those skilled in the art, work in essentially the same way as conventional rotary alternators except instead of a rotary motion, the rotor magnets and stator coils move back and forth in a linear motion relative to one another to induce current. In the present example, the linear alternator 146 relies on the up-and-down motion of the pump assembly 116 to move the coils in the stator 148 back and forth over the magnets in the rotor 150 to induce current in the stator coils. In alternative embodiments, the linear alternator 146 may rely on the pump assembly 116 to move the magnets in the rotor 150 back and forth over the coils in the stator 148 to induce current in the stator coils. In either case, the current induced in the coils of the stator 148 may then be used to power various devices 152 mounted on and around the pump assembly 116 and the wellhead 142.

The devices 152 include various sensors and instruments that measure, for example, rod displacement, rod tension or load, fluid flow rate, temperature, pressure, and other operational parameters. Examples of devices 152 may include load cells, position sensors, flow meters, pressure sensors, temperature sensors, and the like, with wired and/or wireless capability. The devices 152 then transmit their measurements over one or more communication links 154 to a pump control system 156. Any suitable wired or wireless communication link 154 may be used to transmit the measurements from the devices 152 to the pump control system 156, including real-time Ethernet, Bluetooth, Wi-Fi, ZigBee, HART, and like. At the pump control system 156, the measurements are analyzed to determine whether the pump assembly 116 is operating properly or if there are indications of abnormal operation. Based on the analyses of the measurements, the pump control system 156 can automatically control certain operational aspects of the pump assembly 116 to correct for the abnormal operation.

In some embodiments, the pump control system 156 can also send the measurements and analyses thereof (or data therefor) to a network 158 for storage and subsequent monitoring and tracking purposes. Additionally, the pump control system 156 can transmit the measurements and analyses (or data therefor) to an external control system, such as a supervisory control and data acquisition (SCADA) system 160. From there, the data may be forwarded to other systems within an enterprise and/or to the Cloud (which may include a private enterprise Cloud) for further processing as needed. Further, the pump control system 156 can display certain selected measurements and analyses on a display, such as a human-machine-interface (HMI) 162, for review by a user. The user can then navigate the HMI 162 to manually control certain operations of the pump assembly 116 as needed via the pump control system 156.

Figure 2:
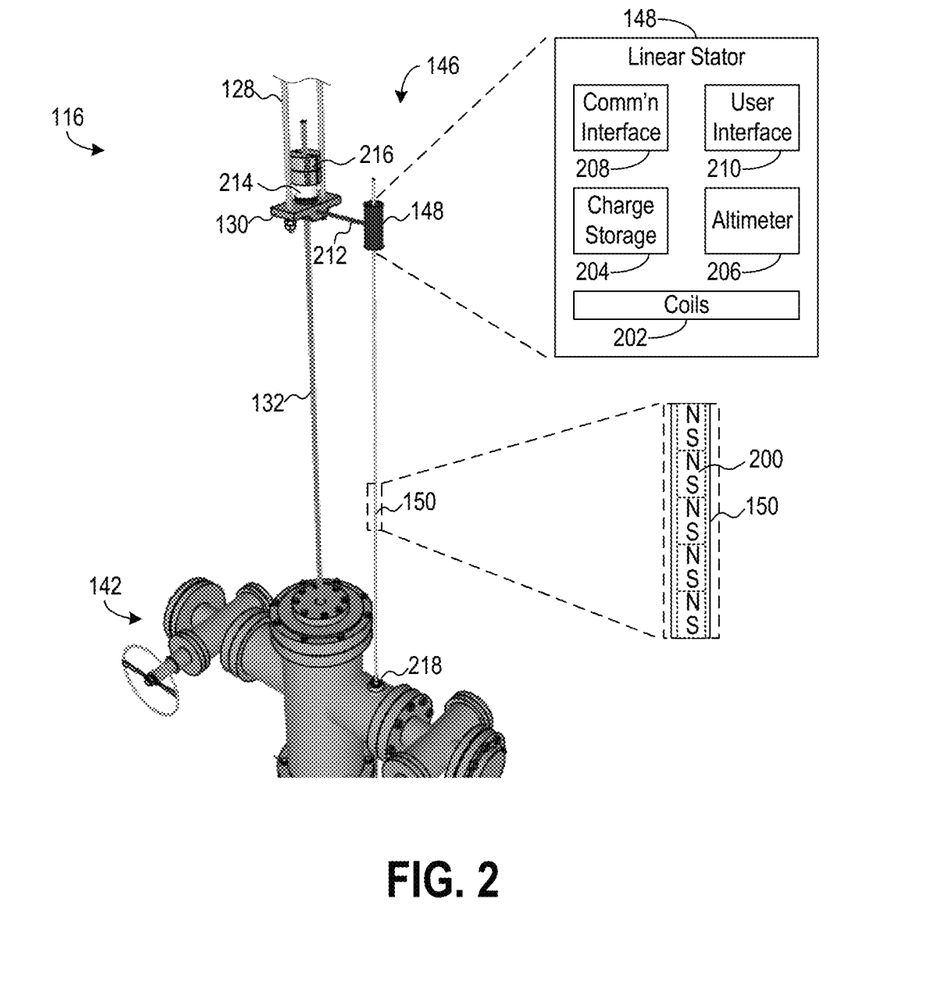
FIG. 2 is a perspective view showing the exemplary linear alternator attached to a bridle of the pump according to embodiments of the present disclosure.

FIG. 2 is a perspective view showing the exemplary linear alternator 146 from FIG. 1 in more detail. As can be seen in this simplified illustration, the linear rotor 150 is positioned within the linear stator 148. This linear rotor 150 resembles a shaft having a plurality of magnets 200 arranged linearly therein along a length of the shaft, while the linear stator 148 has a plurality of coils 202 arranged to receive the linear rotor 150 therethrough. The number and size of the coils 202 may be selected as needed by those having ordinary skill in the art depending on the requirements of the particular application. Similarly, the number and field strength of the magnets 200 may be selected as needed. Note that the magnets 200 only need to occupy a portion of the linear rotor 150, namely the portion expected to pass through the linear stator 148 (e.g., the upper half of the linear rotor 150), although it is possible to have the magnets 200 take up the entire length of the linear rotor 150 if needed. When the magnets 200 in the linear rotor 150 move through the coils 202 in the linear stator 148, a current is induced in the coils 202. This current may then be used to power one or more of the devices 152 (FIG. 1) mounted on and around the pump assembly 116 and the wellhead 142.

In some embodiments, a charge storage unit 204 is provided in the linear stator 148 to temporarily store the current from the coils 202 for subsequent discharge at a specified regulated level. The charge storage unit 204 may be, for example, a capacitor, a battery, and the like that can store a charge and subsequently release the stored charge as a regulated current. In some embodiments, a position sensor such as an altimeter 206 is provided in the linear stator 148 to measure the vertical positions or altitudes of the linear stator 148 as it moves up and down the linear rotor 148. The vertical positions may then be used as a measure of the vertical displacement of the polished rod 132, and hence the sucker rod 134 (FIG. 1).

A communication interface 208 and a user interface 210 are also provided in the linear stator 148 in some embodiments. The user interface 210, which may be an HMI or other display with user input keys or buttons, enables user configuration and control of the linear stator 148. The communication interface 208, which may be a wired or wireless interface, permits communication between the linear stator 148 and the pump control system 156. This allows the linear stator 148 to report, for example, the amount of charge available in the charge storage unit 204 to the pump control system 156 on a regular basis for monitoring purposes. The linear stator 148 may also report the vertical positions measured by the altimeter 206 to the pump control system 156 on a regular basis for monitoring purposes. Alternatively, a self-contained altimeter with built-in wireless capability may be mounted on the linear stator 148 to transmit altitude measurements to the pump control system 156 independently of the linear stator 148. Examples of wireless altimeters are available from PASCO Scientific of Roseville, Calif., USA, among other vendors.

A mounting arm 212 connects the linear stator 148 to the bridle 130 and keeps the linear stator 148 at a fixed vertical and horizontal position relative to the bridle 130. Any suitably rigid or stiff pole, beam, or rod and the like may be used as the mounting arm 212 within the scope of the disclosed embodiments. Multiple mounting arms 212 may be used as needed to maintain the position of the linear stator 148 with respect to the bridle 130. The distance separating the linear stator 148 and the bridle 130 may also be determined as needed within the scope of the disclosed embodiments. In some embodiments, the mounting arm 212 maintains the linear stator 148 at approximately the same height as the bridle 130 and approximately three feet horizontally from the bridle 130, for example.

Power may then be supplied from the linear stator 148 directly to a load cell 214 installed on the bridle 130 via cables (not expressly shown) run along the mounting arm 212. Tension or load measurements made by the load cell 214 (and regularly reported to the pump control system 156) may then be combined with the vertical position measurements made by the linear alternator 146 (via the altimeter 206) to produce dynacards. The dynacards, which are plots of rod load versus displacement, may then be used to monitor and control the rod pump assembly 116. A rod clamp 216 keeps the polished rod 132 connected to (hanging from) the load cell 214.

As for the linear rotor 150, in some embodiments, a ball joint 218 or other pivotable joint may be used to anchor the end of the linear rotor 150 opposite the linear stator 148. The ball joint 218 allows the linear rotor 150 to lean to and fro and side to side as needed to compensate for any horizontal movement of the linear stator 148, for example, due to strong winds. The ball joint 218 may be positioned in any location directly underneath the linear stator 140, for example, on the ground or on the wellhead 142, as shown in the figure.

Figure 3:
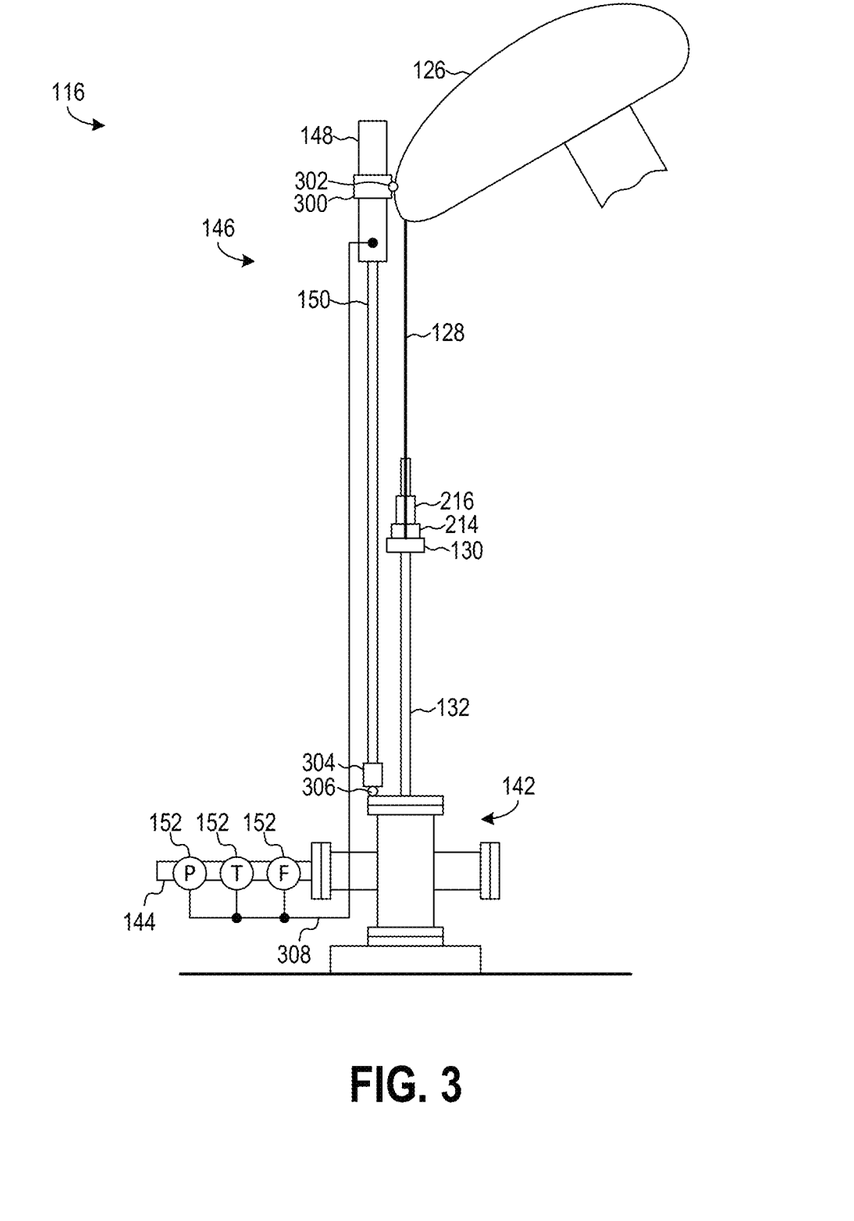
FIG. 3 is profile view showing the linear alternator attached to a wellhead according to embodiments of the present disclosure.

FIG. 3 is a profile view showing an alternative mounting arrangement of the exemplary linear alternator 146 on the rod pump assembly 116. In this example, the linear stator 148 is attached to the donkey head 126, while the linear rotor 150 is again anchored to the wellhead 142. A clamp 300 and ball joint 302 or other pivotable connection may be used attached the linear stator 148 to the donkey head 126. Similarly, a clamp 304 and ball joint 306 or other pivotable connection may be used to connect the end of the linear rotor 150 opposite the linear stator 148 to the bridle 130. Cabling 308 may then be run, for example, along the bridle cable 128 and the polished rod 132 to supply power from the linear stator 148 to the load cell 214 and the devices 152. Operation of the linear alternator 146 shown here is similar to the arrangement shown in FIG. 2. In general, as the donkey head 126 moves up and down, the coils 202 (FIG. 2) in the linear stator 148 move back and forth over the magnets 200 in the linear rotor 150, which induces a current in the coils. This current may then be stored in the linear stator 140 and subsequently released at a predefined regulated level.

Figure 4:
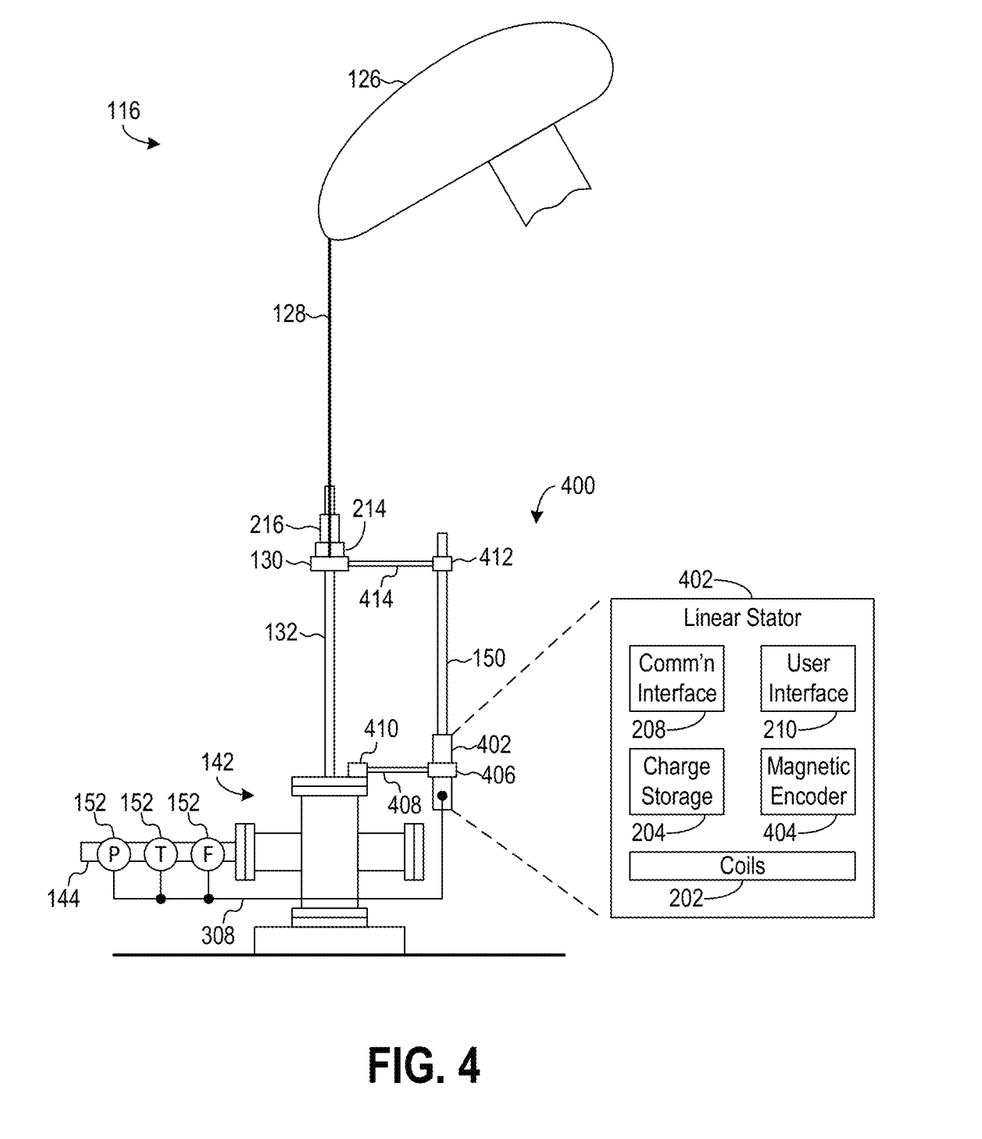
FIG. 4 profile view showing the linear alternator attached a pump head according to embodiments of the disclosure.

FIG. 4 is a profile view showing a mounting arrangement for another linear alternator 400 in which the linear rotor 150 is moved up and down instead. In this embodiment, the linear alternator 400 has a linear stator 402 that can remain stationary. As such, instead of using an altimeter like the altimeter 206, the linear stator 402 uses a magnetic encoder 404 to measure the vertical displacement of the polished rod 132 (and hence the sucker rod 134). Magnetic encoders, as well understood by those having ordinary skill in the art, operate by sensing a change in a magnetic field. The magnetic encoder 404 essentially counts the number of magnets 200 in the linear rotor 150 that pass back and forth through the linear stator 402. This count is then reported by the linear stator 402 on a regular basis to the pump control system 156 (FIG. 1) to monitor the vertical displacement of the polished rod 132 (and hence the sucker rod 134). The linear stator 402 operates in much the same way as the linear stator 148 to induce current. Indeed, the linear stator 402 may be used in place of the linear stator 148 in the linear alternator 146 to achieve essentially the same results.

In some embodiments, a clamp 406 and mounting arm 408 may be used to mount the linear stator 402 at a fixed vertical and horizontal position relative to the wellhead 142. A suitable attachment means 410, such as a bolt, rivet, or well joint, may be used to anchor the mounting arm 408 to the wellhead 142. Similarly, a clamp 412 and mounting arm 414 may be used to mount the end of the linear rotor 150 opposite the linear stator 402 to the bridle 130. Multiple mounting arms 408 and 414 may be used as needed. Preferably there is sufficient clearance underneath the linear stator 402 for the linear rotor 150 to pass back and forth therethrough unobstructed. Cabling 308 may then be run from the linear stator 402 directly to one or more of the devices 152 to supply power thereto.

Embodiments of the present disclosure can also deploy a linear alternator downhole where the plunger 136 and pump barrel 140 are located to generate power for one or more devices 152 downhole. As mentioned earlier, extremely long cables are often needed to supply power to devices 152 that are located downhole, which can be costly to install and maintain. An example of the linear alternator 400 being used to generate power downhole is depicted in FIG. 5.

Figure 5:
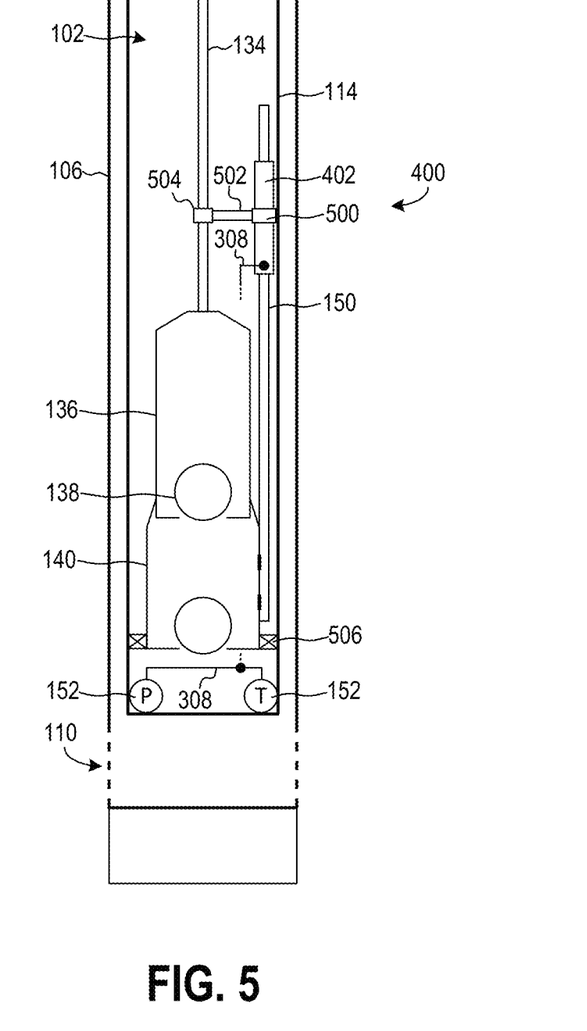
FIG. 5 is profile view showing the linear alternator installed downhole according to embodiments of the present disclosure.

In FIG. 5, the linear alternator 400 is shown with the linear stator 402 mounted or otherwise attached to the sucker rod 134 near the plunger 136, while the linear rotor 150 is mounted or otherwise attached to the pump barrel 140, which remains fixed in place in the tubing 114 via known means. Cabling 308 may then be run from the linear alternator 400 directly to one or more of the devices 152 to provide power to the devices 152. This avoids the need to run cabling from the surface down to the devices 152 (which are wireless sensors). In the example shown, the linear stator 402 is attached to the sucker rod 134 via a clamp 500, connecting arm 502, and connector 504. Any suitable attachment means may be used to attach the linear rotor 150 to the pump barrel 140, such as brackets, screws, weld joints, and the like. In some embodiments, one or more sealing elements 506 may be disposed downhole between the tubing 114 and the pump barrel 140 to seal off the space between the tubing 114 and the pump barrel 140.

Operation of the linear alternator 400 in FIG. 5 is similar to operation in FIG. 4, but with the rotor 150 remaining stationary while the linear stator 402 moves up and down with the plunger 136. Those having ordinary skill in the art will of course appreciate that it is possible to swap the positions of the linear stator 402 and the linear rotor 150, such that the linear rotor 150 moves up and down with the plunger 136 while the linear stator 402 remains stationary. Indeed, in the various embodiments described herein, the positions of the linear stator and the linear rotor may be reversed within the scope of the disclosed embodiments. Thus, in the embodiment of FIG. 3, for example, the linear rotor 150 may be attached to the donkey head 126 and the linear stator 148 may be attached to the wellhead 142.

In the foregoing, specific embodiments of the present disclosure were shown and described with respect to mounting a linear alternator on a rod pump assembly at a well site. Following now is general method of using a linear alternator with a rod pump assembly to generate power at a well site according to embodiments of the present disclosure.

Figure 6:
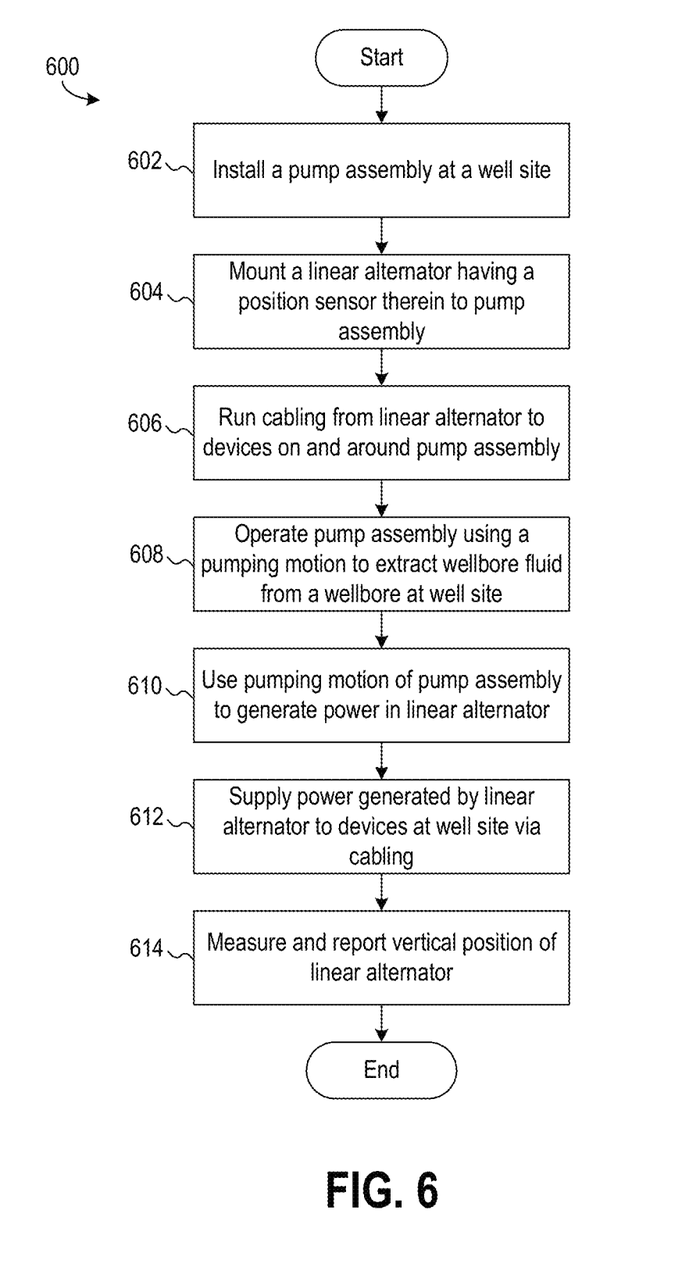
FIG. 6 is flow diagram illustrating an exemplary method that may be used to generate power directly at the well site according to embodiments of the disclosure.

Referring to FIG. 6, a flow diagram illustrating an exemplary method 600 is shown for using a linear alternator with a rod pump assembly to generate power at a well site. The method generally begins at 602 where a pump assembly is installed at the well site. The pump assembly may be a rod pump assembly or other pump mechanism that uses an up-and-down pumping motion to extract wellbore fluid from a wellbore at the well site. At 604, a linear alternator is mounted to the pump assembly to measure a vertical position of the linear stator or the vertical distance traveled by the linear rotor if the linear stator remains stationary. The linear alternator has a linear stator and a linear rotor positioned within the stator. The linear stator may be mounted so as to remain stationary while the linear rotor moves back and forth in some embodiments, or the linear rotor may be mounted so as to remain stationary while the linear stator moves back and forth in some embodiments. In some embodiments, the linear stator may have a position sensor (e.g., altimeter, magnetic encoder, etc.) therein to measure a vertical position (e.g., altitude or height) of the linear stator as it moves up and down, or measure the vertical distance traveled by the linear rotor as it moves back and forth if the linear stator remains stationary. At 606, cabling is run from the linear alternator to various devices mounted on and around the pump assembly.

The pump assembly is then operated at 608 using the pumping motion. This pumping motion causes either the linear stator or the linear rotor of the linear alternator to move relative to one another at 610, thereby inducing current in the linear stator to generate power. At 612, the power generated by the linear alternator is supplied to the various devices on and around the pump assembly via the cabling from 606. In some embodiments, at 614, the linear alternator may measure the vertical positions (e.g., altitude or height) of the linear stator as it moves up and down, or measure the vertical distance traveled by the linear rotor (i.e., by counting the magnets therein) as it moves back and forth if the linear stator remains stationary. The position measurements or distance traveled measurements may then be reported to a pump control system on a regular basis and/or as needed for monitoring and control purposes.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A system for generating power at a well site, comprising:

a rod pump assembly at the well site, the rod pump assembly operable to extract wellbore fluid from a wellbore at the well site using a pumping motion, the rod pump assembly including a polished rod, a bridle configured to receive the polished rod therethrough, and a sucker rod configured to be connected to the polished rod;

a linear alternator configured to be mounted to the bridle of the rod pump assembly, the linear alternator having a linear stator including coils therein and a linear rotor including a plurality of discrete magnets therein and positioned within the linear stator;

a charge storage unit provided in the linear stator and configured to temporarily store current from the coils in the linear stator for subsequent discharge;

a communication interface provided in the linear stator and configured to communicate an amount of charge available in the charge storage unit to a pump control system external to the linear alternator; and a user interface provided on the linear stator and configured to allow a user to configure the linear stator;

wherein the pumping motion used by the rod pump assembly causes the linear rotor to pass back and forth through the linear stator to thereby generate power, and wherein the linear alternator is mounted to the rod pump assembly at a downhole location of the rod pump assembly.

2. The system of claim 1, wherein the linear alternator includes a position sensor operable to measure a vertical position of the linear stator or the linear rotor.

3. The system of claim 2, wherein the position sensor is one of an altimeter or a magnetic encoder.

4. The system of claim 1, wherein the linear rotor moves with the pumping motion used by the pump assembly and the linear stator remains stationary.

5. The system of claim 1, wherein the linear stator moves with the pumping motion used by the pump assembly and the linear rotor remains stationary.

6. The system of claim 1, wherein:

the power generated by the linear alternator is conveyed to one or more devices mounted on or around the rod pump assembly, the one or more devices operable to measure one or more operational parameters of the rod pump assembly.

7. The system of claim 6, wherein the power generated by the linear alternator is conveyed by cabling running from the linear alternator to the one or more devices.

8. The system of claim 7, wherein the one or more devices include a load cell mounted on the pump assembly, the load cell operable to measure a tension or load on the pump assembly.

9. The system of claim 1, further comprising:

a user interface on the linear stator, the user interface configured to allow a user to configure the linear stator.

10. The system of claim 9, wherein the user interface is a Human-Machine Interface (HMI) or other display with user input keys or buttons.

11. A method of generating power at a well site, comprising:

installing a rod pump assembly at the well site, the rod pump assembly including a polished rod, a bridle configured to receive the polished rod therethrough, and a sucker rod configured to be connected to the polished rod;

mounting a linear alternator to the bridle of the rod pump assembly, the linear alternator having a linear stator including coils therein and a linear rotor including a plurality of discrete magnets therein and positioned within the linear stator; and temporarily storing current from the coils in the linear stator in a charge storage unit provided in the linear stator for subsequent discharge;

communicating an amount of charge available in the charge storage unit to a pump control system external to the linear alternator via a communication interface provided in the linear stator; and configuring the linear stator via a user interface provided in the linear stator;

operating the rod pump assembly using a pumping motion to extract wellbore fluid from a wellbore at the well site;

wherein the pumping motion used by the rod pump assembly causes the linear rotor to pass back and forth through the linear stator to thereby generate power, and wherein the linear alternator is mounted to the rod pump assembly at a downhole location of the rod pump assembly.

12. The method of claim 11, further comprising providing a position sensor in the linear alternator, the position sensor operable to measure a vertical position of the linear stator or the linear rotor.

13. The method of claim 12, wherein the position sensor is one of an altimeter or a magnetic encoder.

14. The method of claim 11, wherein the linear rotor moves with the pumping motion used by the pump assembly and the linear stator remains stationary.

15. The method of claim 11, wherein the linear stator moves with the pumping motion used by the pump assembly and the linear rotor remains stationary.

16. The method of claim 11, further comprising:

conveying the power generated by the linear alternator to one or more devices mounted on or around the rod pump assembly, the one or more devices operable to measure one or more operational parameters of the rod pump assembly.

17. The method of claim 16, wherein the power generated by the linear alternator is conveyed by cabling running from the linear alternator to the one or more devices.

18. The method of claim 17, wherein the one or more devices include a load cell mounted on the pump assembly, the load cell operable to measure a tension or load on the pump assembly.

19. The method of claim 11, further comprising:

providing a user interface on the linear stator, the user interface configured to allow a user to configure the linear stator.

20. The method of claim 19, wherein the user interface is an Human-Machine Interface (HMI) or other display with user input keys or buttons.

* * * * *